(12) United States Patent
Keuning

(10) Patent No.: US 8,863,678 B2
(45) Date of Patent: Oct. 21, 2014

(54) SHIP

(75) Inventor: Jan Alexander Keuning, Willestad (NL)

(73) Assignee: Technische Universiteit Delft (NL)

( * ) Notice: Subject to any disclaimer, the term of this patent is extended or adjusted under 35 U.S.C. 154(b) by 0 days.

(21) Appl. No.: 12/346,463

(22) Filed: Dec. 30, 2008

(65) Prior Publication Data
US 2009/0114137 A1 May 7, 2009

Related U.S. Application Data

(63) Continuation of application No. PCT/EP2007/056613, filed on Jun. 30, 2007.

(30) Foreign Application Priority Data

Jun. 30, 2006 (EP) .................................. 06116486

(51) Int. Cl.
| | | |
|---|---|---|
| *B63B 1/04* | (2006.01) | |
| *B63B 1/06* | (2006.01) | |
| *B63B 39/06* | (2006.01) | |
| *B63H 25/06* | (2006.01) | |
| *B63H 25/38* | (2006.01) | |
| *B63H 25/40* | (2006.01) | |
| *B63H 25/44* | (2006.01) | |

(52) U.S. Cl.
CPC ...... *B63B 1/06* (2013.01); *B63H 25/44* (2013.01); *B63B 2001/066* (2013.01); *Y02T 70/126* (2013.01); *B63H 25/38* (2013.01); *B63H 2025/063* (2013.01)
USPC .... 114/122; 114/56.1; 114/61.27; 114/61.32; 114/126; 114/144 R; 114/162

(58) Field of Classification Search
USPC .......... 114/56.1, 57, 61.27–63, 144 R, 145 R, 114/146, 150–152, 162–172, 121, 122, 126
See application file for complete search history.

(56) References Cited

U.S. PATENT DOCUMENTS

| | | | | |
|---|---|---|---|---|
| 65,093 | A | * | 5/1867 | Kunnert ......................... 114/163 |
| 355,682 | A | * | 1/1887 | Cowles ........................... 114/57 |

(Continued)

FOREIGN PATENT DOCUMENTS

| | | |
|---|---|---|
| DE | 2634573 A1 | 2/1978 |
| DE | 3122863 A1 | 1/1983 |

(Continued)

OTHER PUBLICATIONS

International Search Report and Written Opinion, Oct. 9, 2007, 4 pages.

(Continued)

*Primary Examiner* — Ajay Vasudeva
(74) *Attorney, Agent, or Firm* — St. Onge Steward Johnston & Reens LLC

(57) ABSTRACT

A ship for use at high speed and/or heavy seas having a single long and slender hull, a sharp bow and the aft end of the hull has a flat or slightly V-shaped bottom with at least one aft rudder, and at least one propeller or water jet for propulsion whereby the foreship has a draught that is equal or more than the draught of the aft end. The bow has a control surface that converts the water flow along the forward moving ship into an adjustable lateral force.

10 Claims, 4 Drawing Sheets

(56) References Cited

U.S. PATENT DOCUMENTS

| | | | |
|---|---|---|---|
| 557,052 A * | 3/1896 | Cole | 114/145 R |
| 1,136,332 A * | 4/1915 | Heinze | 114/163 |
| 1,211,316 A * | 1/1917 | Jantzen | 114/163 |
| 1,697,779 A * | 1/1929 | Roos | 114/162 |
| 2,342,707 A * | 2/1944 | Troyer | 114/61.3 |
| 2,363,335 A * | 11/1944 | Katcher et al. | 114/144 R |
| 2,974,624 A * | 3/1961 | Lewis | 114/61.3 |
| 4,380,206 A * | 4/1983 | Baitis et al. | 114/122 |
| 4,633,710 A * | 1/1987 | Shatto, Jr. | 73/178 R |
| 4,769,773 A * | 9/1988 | Shatto, Jr. | 701/21 |
| 4,915,048 A * | 4/1990 | Stanford | 114/274 |
| 5,129,343 A * | 7/1992 | Giles | 114/271 |
| 5,152,239 A * | 10/1992 | Hossfield et al. | 114/144 E |
| 5,179,905 A * | 1/1993 | Hossfield et al. | 114/144 E |
| 5,523,951 A * | 6/1996 | Kriesgman et al. | 701/21 |
| D465,189 S * | 11/2002 | Brooks et al. | D12/300 |
| 6,837,758 B2 * | 1/2005 | Drefs et al. | 440/6 |
| 6,843,193 B1 * | 1/2005 | Alvarez-Calderon | 114/56.1 |
| 8,047,148 B2 * | 11/2011 | Keuning | 114/61.27 |
| 2003/0089290 A1 | 5/2003 | Van Diepen | |

FOREIGN PATENT DOCUMENTS

| | | | | |
|---|---|---|---|---|
| FR | 631214 | | 12/1927 | |
| JP | 61046784 A | * | 3/1986 | B63B 1/18 |
| JP | 61071295 A | * | 4/1986 | B63B 39/06 |
| JP | 61125981 A | * | 6/1986 | B63B 1/20 |
| JP | 61129390 A | * | 6/1986 | B63B 1/20 |
| JP | 61178284 A | * | 8/1986 | B63B 1/18 |
| JP | 61178294 A | * | 8/1986 | B63H 5/08 |
| JP | 63312298 A | * | 12/1988 | B63H 25/40 |
| WO | WO 9106466 A1 | * | 5/1991 | B63B 39/06 |
| WO | 9836961 A1 | | 8/1998 | |

OTHER PUBLICATIONS

Proceedings of the 6th Symposium on High Speed Marine Vehicles 2002 Conference, Organized by Dipartimento di Ingegneria Navale—Università degli Studi di Napoli "Federico II", ATENA—Associazione Italiana di Tecnica Navale, 6th HSMV, Sep. 2002, 15 pages.

The Effect of Bowshape on the Seakeeping Performance of a Fast Monohull, Authors: Alexander (J.A.) Keuning, Serge Toxopeus and Jakob Pinkster, FAST 2001: Sep. 4-6, 2001, Southhampton, UK, The Royal Institution of Naval Architects 2001, 15 pages.

Chinese Office Action (4th) Application No. CN 200780024988.3 Date: Oct. 29, 2012 2 pages.

* cited by examiner

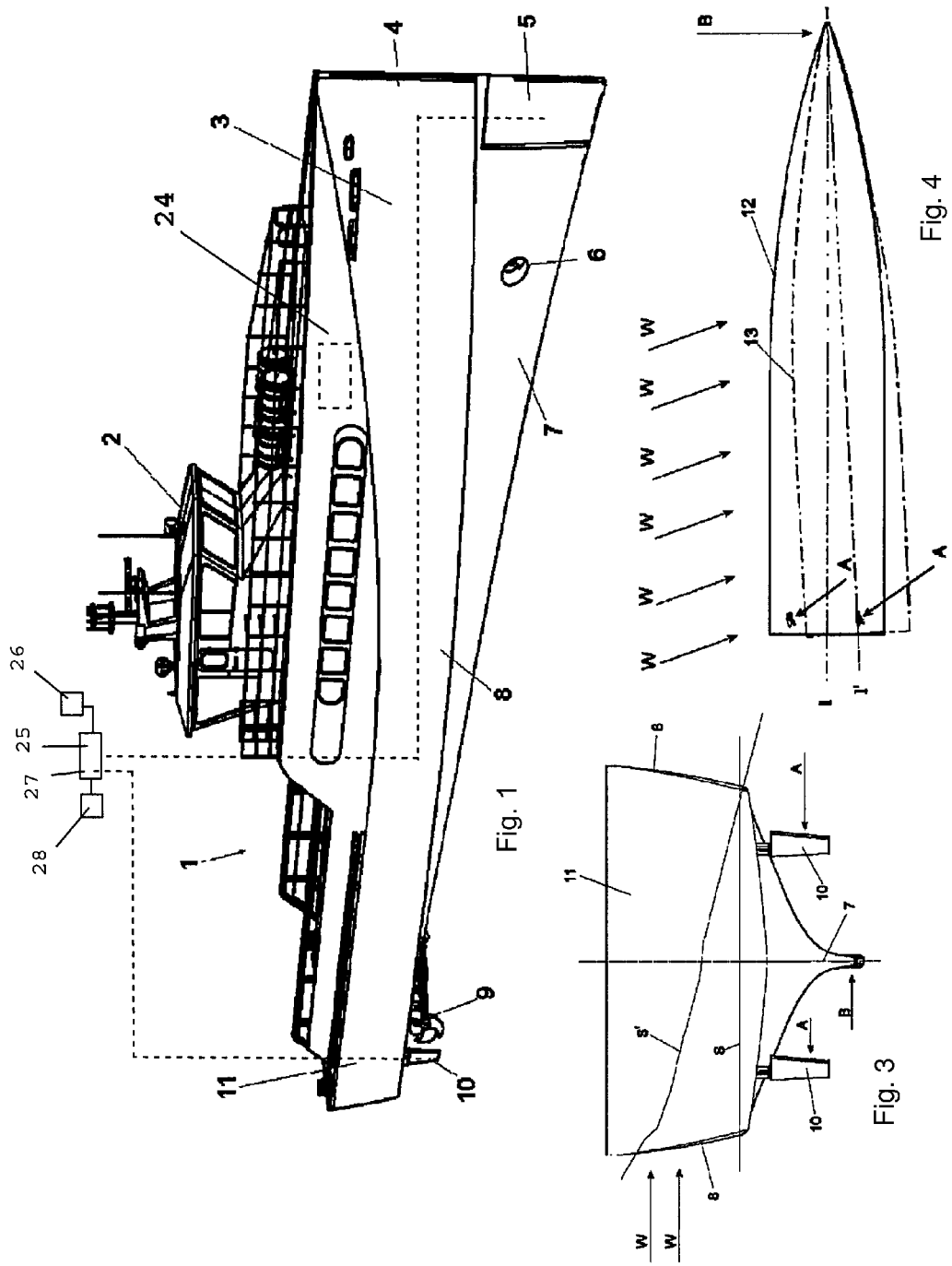

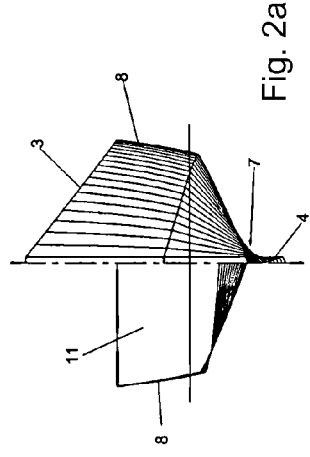
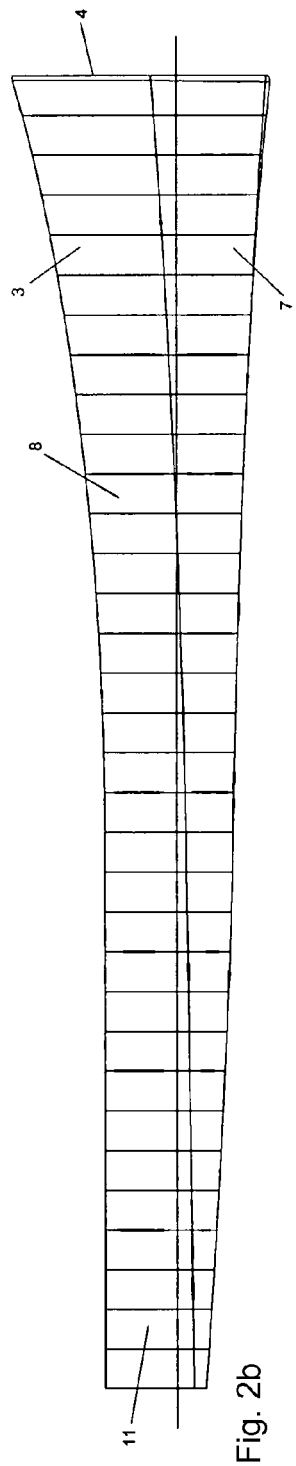
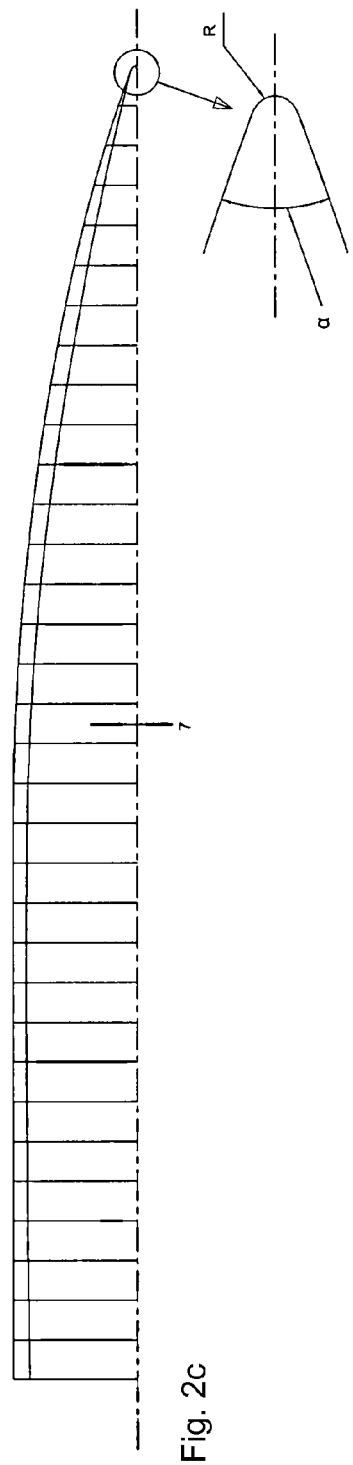
Fig. 2a
Fig. 2b
Fig. 2c

SHIP

CROSS-REFERENCE TO RELATED APPLICATIONS

The present application is a continuation of pending International patent application PCT/EP2007/056613 filed on Jun. 30, 2007, which designates the United States and claims priority from European patent application 06116486.9 filed on Jun. 30, 2006, the content of which is incorporated herein by reference.

FIELD OF THE INVENTION

The invention concerns a ship for use at high speed and/or heavy seas having a single long and slender hull, a bow and the aft end of the hull has a flat or slightly V-shaped bottom with at least one aft rudder, one or more propellers and/or water jets as propulsions means whereby the foreship has a draught that is equal or more than the draught of the aft end characterized in that the bow has a control surface that converts the water flow along the forward moving ship into an adjustable lateral force.

BACKGROUND OF THE INVENTION

For most ships of such design the condition of sailing in relative large stern quartering or following waves can become dangerous due to the occurrence of "broaching". Broaching is the peculiar ship behaviour, which consists of a coupled yaw-, sway-and roll motion. Ships may experience this broach motion in the described wave condition and once it occurs it can lead to seriously large roll angles and eventually end in a "capsize".

The broaching phenomenon may be roughly explained as follows: In stern quartering and following waves the ship stern is lifted asymmetrically by the incoming wave and it starts the ship to heel (and also pitch). Broaching is particularly prone in waves with a wave length close to the ship length. So simultaneously the ship puts its bow in the face of the (next) wave. Caused by the asymmetry of the hull due to the introduced heeling angle and the directionally destabilizing effect of the now deeply immersed bow sections the ship starts to yaw. Combined with the forward speed this may lead to an increase in the heeling angle which on its turn worsens the hull asymmetry and therewith to further course instability. This may lead to the ship coming beam side to the waves in principal a potentially dangerous situation as it may lead to an even further increase in heel.

With fast ships this broaching phenomenon may be encountered more frequently than with regular ships and may have more serious effects because fast ships are generally smaller and sail therefore in relatively larger waves. Also the high forward speed worsens the heeling influence induced by the centrifugal forces once the ship is in a turn and the encounter frequency between the ship and the following waves. In particular the longer and higher waves may have a lower frequency making their impact bigger.

Ships are normally directionally controlled by either a helmsman or an autopilot. In general the applied control is aimed at keeping the ship on a preset course. From experience, full scale and model scale measurements it is known that this directional control applied in following waves worsens the broaching behavior of the ship, due to the unfavourable phase between the steering force applied and the herewith induced heeling moment.

SUMMARY OF THE INVENTION

In order to overcome these disadvantages, according to the invention is a ship in accordance with the claims hereof. In this way the resistance against broaching is increased by using the additional control surface for directional control and to make beneficial use of the forces generated by this surface for controlling the roll and sway motion. By applying a control surface in the most forward position as feasible, this control surface may be regarded as an additional control surface for controlling both yaw and heel simultaneously. Then the following improvement occurs: In the situation that the ship sails in stern quartering waves from starboard the stern can be lifted by a wave where after the ship starts to heel to port. The asymmetry of the hull underwater shape induces a yawing moment trying to turn the ship to starboard. Corrective action is applied on the control surface near the bow to correct this course change and the force asked for is a lateral force directed to port. This force implies a rolling motion to starboard and so de-creasing the heeling angle.

In accordance with another embodiment of the invention a ship of this design is especially favourably for the application of this invention. Such a ship is known from the publication Keuning, J. A.; Toxopeus, S.; Pinkster, J.; The effect of bow-shape on the sea keeping performance of a fast monohull; Proceedings of FAST 2001 conference, September 2001; page 197-206; ISBN 0 903055 70 8, publisher The Royal Institute of Naval Architects. In this publication the ship is described as the AXE BOW design. The increased draught and increased freeboard makes the ship suitable for sailing through heavy seas while ensuring that the control surface remains in heavy seas sufficiently submerged.

In accordance with another embodiment of the invention the more or less vertical bow is particularly suitably for incorporating a control surface according to the invention.

In accordance with another embodiment of the invention this fillet radius makes it possible to reduce the length of the ship and so reducing the wet surface and the flow resistance without disadvantageously influencing the ships behavior in waves.

In accordance with another embodiment of the invention this improves the ships behavior in heavy seas as the added resistance in waves is reduced.

In accordance with another embodiment of the invention this makes for a simple construction with effective steering and control capabilities.

In accordance with another embodiment of the invention this makes for an easy construction with good water flow along the hull, thereby minimizing additional drag when not activated.

In accordance with another embodiment of the invention this embodiment combines at high speeds good control capabilities with high efficiency.

In accordance with another embodiment of the invention the reducing of the heeling and broaching can be combined in an easy way.

In accordance with another embodiment of the invention the use of the control surface can be manually adapted to the changing circumstances and wave conditions.

In accordance with another embodiment of the invention the use of the control surface is adapted automatically to the changing circumstances and wave conditions.

In accordance with another embodiment of the invention the control surface is only activated when its use improves the ships behaviour.

BRIEF DESCRIPTION OF THE DRAWINGS

The invention will be explained in more detail below with reference to several exemplary embodiments by means of a drawing, in which:

FIG. 1 shows a perspective view of a ship according a first embodiment of the invention, FIG. 2 shows a body plan of the design of the ship according to the invention, whereby FIG. 2a shows the various cross sections, FIG. 2b shows the side view and FIG. 2c shows the bottom view, FIGS. 3 and 4 show the ship of FIG. 1 respectively from behind and from the top with schematically an indication of the forces in waves, FIG. 7b shows section VIIb-VIIb of FIG. 7a.

DETAILED DESCRIPTION OF THE INVENTION

Figure 5A:
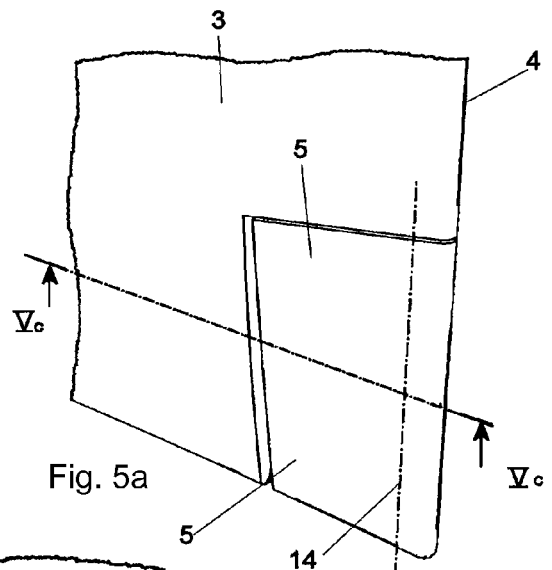
FIG. 5a shows the bow of the ship of FIG. 1 with the first embodiment of the control surface in perspective view, FIG. 5b show the same embodiment in front view

FIG. 1 shows a ship 1 which is designed in accordance with the body plan according to FIG. 2. The ship 1 is designed for high speeds and has a single long and slender hull, whereby the length of the hull is at least five times the beam and for longer ships as much as seven to eight times the beam. In shorter ships the beam is relatively larger as the hull must include the propulsion means and a wider beam ensures that there remains sufficient stability. The ship 1 in an aft ship 11 has one or more propellers 9 and one or more aft rudders 10. For maneuvering at low speed there is a bow thruster 6 in a foreship 3 near a bow 4. The lay out on deck is as usual for instance with a wheel house 2. In the bow 4 there is a bow rudder 5 of which the function will be explained later.

As can be seen in FIG. 2 the hull of the ship 1 has a special design, in more detail the design is such that a reduction of the Froude Kriloff forces in particular in the foreship 3 is achieved by minimizing the change in momentaneous submerged volume of the hull with sides 8 whilst it makes larger relative motions relative to the water level due to waves or the ships motions.

This results in a design applying sides 8 as much as feasible. A further measure in the design is to reduce the change in waterline beam of the sections in particular in the foreship 3 whilst it makes the foresaid larger relative motions. This implies there is a minimal flare in the bow sections and a bow 4 has a more or less vertical line or the bow 4 extends less than 5 degrees forward and backward. By doing so the change of the added mass of the sections is minimized and with that also the changes in the hydrodynamic lift in the foreship 3 are minimized. By increasing the free board and bringing the deck line higher towards the bow 4 in the foreship 3 sufficient reserve buoyancy is guaranteed.

The amount of increased shear in the foreship 3 is dependent on ship size, speed and wave climate involved. A downwards sloping centre line towards the foreship 3 prevents the sections there to leave and re-enter the water whilst the ship 1 is performing larger relative motions. The amount of negative slope in the bottom 7 is dependent on ship size, speed and wave climate involved. The dead rise angle of the sections from bow to stern is carefully determined in order to minimize exciting forces and yet maintain sufficient hydrodynamic lift with minimal resistance.

Summarized the shape of the hull is such that the hull is long and slender, there is no flare in the bow sections and the sides 8 at the bow sections are almost vertical. Near the bow 4 the sides 8 make an angle α seen in a horizontal plane which is smaller than 40 degrees. There is an increased sheer forward and down sloping centre line forward and the entry of the waterlines are rounded. In order to reduce the wet surface the bow 4 is rounded with a radius R of at least 0.1 m. Depending on the beam of the ship the radius can be at least 1% of the beam. A further advantage of this radius R is that vortex shedding along the sides 19 of the ship is avoided in this way. This vortex shedding might occur in this design at small yaw angles when the bow is too sharp as is usual with fast ships. The vortex shedding must be avoided as it might lead to course instability. In order to prevent that the rounded bow 3 generates too much stagnation point resistance and/or generates too much spray the radius R is less than 4% of the beam.

FIGS. 3 and 4 show the behaviour of ship 1 in waves W that approach the aft ship 11 from the stern quarter. A water level s is the normal situation when the ship 1 is level. When waves W approach the aft ship 11 from the port stern quarter the waves create a water level s'. The waves W push against the port side 8 of the aft ship 11 and change the direction of the ships axis 1 from the on course situation indicated with 12 to the off course direction whereby the ships axis is indicated with 1' and the ship is indicated with 13.

When the ship 1 is off course the ship 1 can be brought on course using aft rudders 10. These rudders 10 are then brought in a position as shown in FIGS. 3 and 4 and a force A is generated on the aft rudders 10. This force creates with the force of the waves W a tilting torque. Summarized the forces A on the aft rudders 10 reinforce the forces of the waves W on the side 8. If the ship 1 is brought on course using a bow rudder 5 a force B is generated on the bow rudder 5. This force B has the same direction as the force generated by the waves W and so counteracts the tilting torque of the waves W. Summarized the force B on the bow rudder 5 used for bringing the ship 1 on course reduces the tilting due to the waves W. This advantageous result is only for waves W that are incoming from the stern quarter as for waves W coming in from the front (not shown) using the bow rudder 5 would result in increased tilting.

The bow rudder 5 is only used when the waves W coming in sideways result in the course change as indicated before when waves are coming in from the stern quarter of the ship 1. In the situation whereby the ship 1 is designed with its maximum draught in the foreship 3, as described before, waves W coming in sideways or a few compass points forward will result in the same behaviour and the use of the bow rudder 5 is then also an advantage.

The ship 1 is provided with means to switch over from steering with the aft rudder 10 to steering with the bow rudder 5 or with both rudders. When steering using an automatic steering system 25 the switching over can be effected by manually indicating to the automatic steering system 25 from which direction, i.e., angle, waves W are coming in, which steering system 25 will then take this information into account. The automatic steering system 25 can also include an algorithm 27 for calculating the direction, i.e., angle, from which the waves W are coming in. The automatic system is then provided with sensors 28 for determining the movements of the ship 1, for instance using gyroscopes.

Figure 5B:
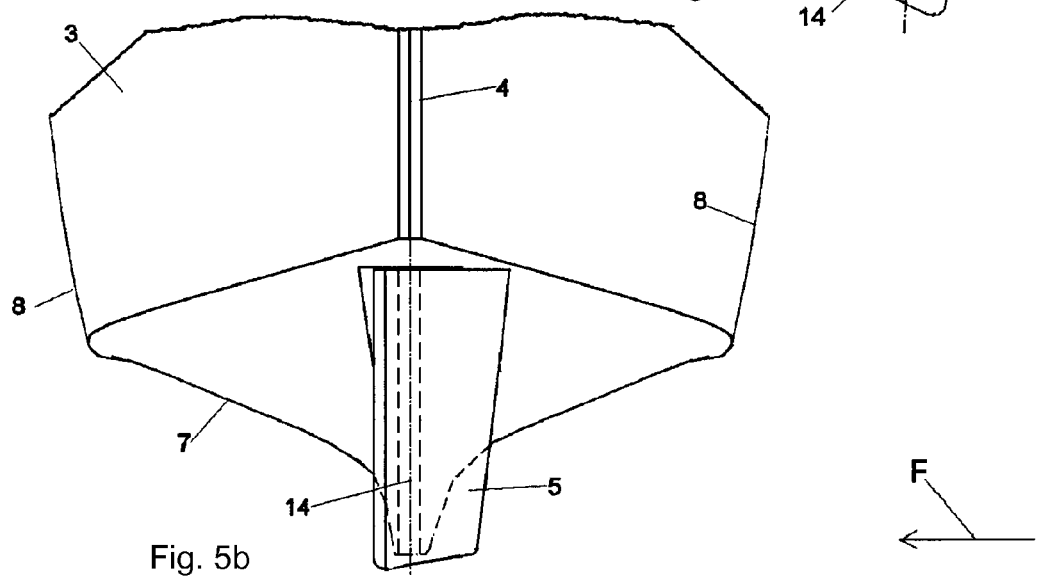
FIG. 5c shows a section Vc-Vc of FIG. 5a, FIG. 6a shows a second embodiment of the control surface in a perspective view
Figure 5C:
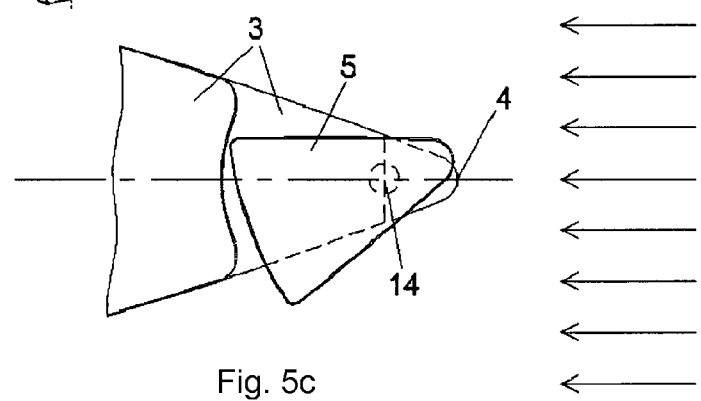

FIGS. 5a, 5b and 5c show the bow rudder 5 mounted in the foreship 3 in more detail. The bow rudder 5 is the lowest part of the bow 4 and has a rotation axis 14 which is more or less vertical. The bow rudder 5 is shaped such that when it is in its middle position the contour of the rudder 5 follows the shape of the hull as indicated in FIG. 2 and the water flow F is not influenced by the bow rudder 5. Part of the bow rudder 5 is in front of the rotation axis 14 so that the torque for rotating the bow rudder 5 is partly balanced, similar as can be used in known rudders. The rotation of the bow rudder 5 is effected in the same manner as usual with known rudders.

Figure 6A:
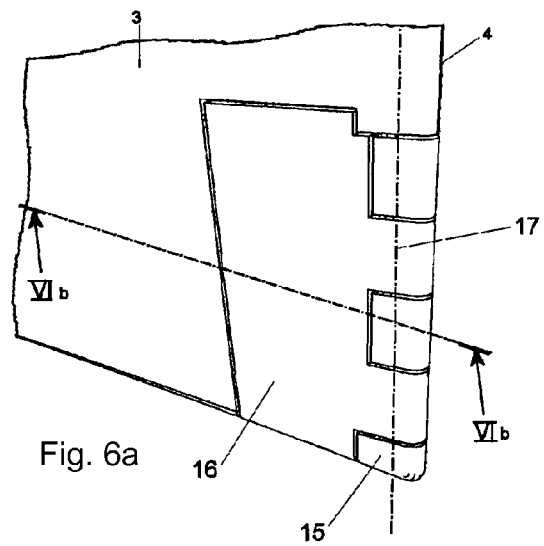
FIG. 6b shows section VIb-VIb of FIG. 6a, and FIG. 7a shows a third embodiment of the control surface in a perspective view
Figure 6B:
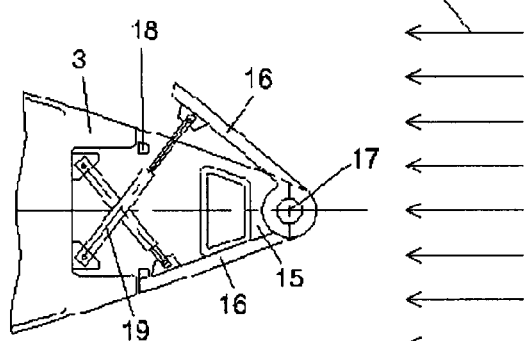

FIGS. 6a and 6b show a second embodiment of the bow 4 of the ship 1. Instead of a conventional rudder located in the bow 4 the lateral forces B for steering the ship 1 are now generated by the flow F along a side flap 16. On each side of the bow 4 there is a side flap 16, these side flaps 16 rotate around a more or less vertical axis 17, which axis 17 is supported at the lowest part of the bow 4 by a support 15. When not activated the side flaps 16 follow the contour of the foreship 3 and are positioned against a brace 18. For moving the side flaps 16 so that they can generate an adjustable lateral force B there is a mechanism 19. This mechanism 19 can be formed by two hinged levers connected to each other and respectively the foreship 3 and the side flap 16. The hinge connecting these levers can be moved in vertical direction by a hydraulic cylinder (not shown). This hydraulic cylinder can be located above the water level and is con-trolled such that either the one or the other side flap 16 is moved outside the contour of the foreship 3 in order to generate the lateral force B.

Figure 7A:
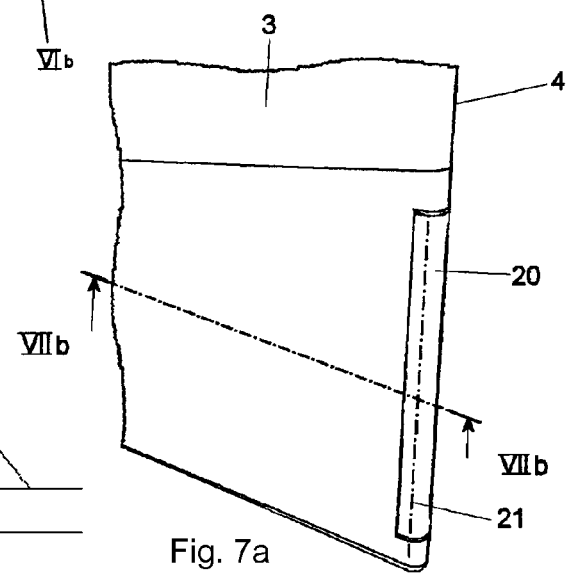
Figure 7B:
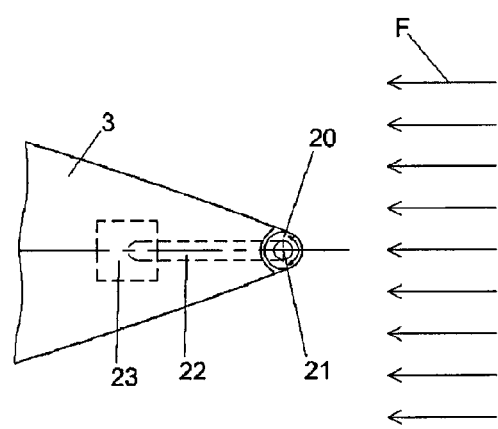

FIGS. 7a and 7b show a third embodiment of the bow 4 of ship 1. A submerged part of the bow 4 now consists of a rotor 20 that can rotate around a more or less vertical rotation axis 21. For driving the rotor 20 there is a drive 23 that drives the rotor 20 via a transmission 22. The drive 23 can be electric or hydraulic and can be located above the water level. During rotation the rotor 20 acts as a so called Magnus rotor and generates asymmetric pressure fields at the different sides of the bow 4 so that a lateral force B is the result. By changing the speed of rotation of the rotor 20 the magnitude of the lateral force B can be adjusted.

What is claimed is:

1. A ship for use at high speed and heavy seas having a single long and slender hull, with a foreship having a bow and an aft end that has a flat or slightly V-shaped bottom with at least one aft rudder and propulsion means comprising either at least one propeller or water jets;
   wherein the foreship has a draught that is greater than the draught of the aft end;
   wherein the ship has an automatic steering system to maintain the ship on a preset course when it moves at high speed;
   wherein the bow has a control surface on which the water flow (F) along the bow of the forward moving ship generates an adjustable lateral force (B); and
   wherein the automatic steering system is configured such that when the ship is moving forward on the preset course and waves are approaching the aft end from a stern quarter, the steering system activates the control surface to counteract yawing and heeling of the hull caused by the stern quarter waves, thereby maintaining the ship on the preset course.

2. The ship according to claim 1 whereby sides near the bow seen in a horizontal section make a sharp angle (α) with a fillet radius (R) of between 1% and 4% of a beam.

3. The ship according to claim 1 whereby the direction of incoming waves is manually indicated to the automatic steering system.

4. The ship according to claim 1 whereby the automatic steering system is provided with sensors for determining the ship's movements and with a system configured for calculating the angles of incoming waves relative to the course.

5. The ship according to claim 4 whereby the sensors for determining movements of the ship comprise gyroscopes.

6. The ship according to claim 1 whereby the foreship has a downward sloping centerline towards the bow and cross sections in the front half of the hull have substantially vertical sides, minimal flare in the bow sections and towards the bow an increase in draught at its centerline combined with a more or less similar increase of freeboard.

7. The ship according to claim 6 whereby the bow has a substantially vertical stem.

8. The ship according to claim 1 whereby the bow has a substantially vertical stem.

9. A ship for use at high speed and heavy seas having a single long and slender hull, with a foreship having a bow and an aft end that has a flat or slightly V-shaped bottom with at least one aft rudder and propulsions means comprising either at least one propeller or water jets whereby the foreship has a draught that is more than the draught at the aft end
   wherein the ship comprises:
      an automatic steering system to maintain the ship on a preset course; and,
      a bow control surface on which the water flow (F) along the bow of the forward moving ship generates an adjustable lateral force (B)
      wherein the automatic steering system comprises sensors that determine the ship's movements and a system that is configured for calculating the angle of incoming waves relative to the preset course; and,
      wherein the automatic steering system is configured such that when the ship is moving forward on the preset course and waves are approaching the aft end from a stern quarter, the steering system activates the control surface to counteract yawing and heeling of the hull caused by the stern quarter waves, thereby maintaining the ship on the preset course.

10. A ship for use at high speed and heavy seas having a single long and slender hull, with a foreship having a bow and an aft end that has a flat or slightly V-shaped bottom with at least one aft rudder and propulsions means comprising either at least one propeller or water jets whereby the foreship has a draught that is more than the draught at the aft end of a keel
   wherein the ship comprises
      an automatic steering system to maintain the ship on a preset course; and
      a bow control surface on which the water flow (F) along the bow of the forward moving ship can generate an adjustable lateral force;
      wherein the automatic steering system is configured to receive input indicating the angle of incoming waves relative to the preset course; and,
      wherein the automatic steering system is configured such that when the ship is moving forward on the preset course and waves are approaching the aft end from a stern quarter, the steering system activates the control surface to counteract yawing and heeling of the hull caused b the stern quarter waves thereby maintaining the ship on the preset course.

* * * * *